(12) United States Patent
Cai et al.

(10) Patent No.: US 12,548,811 B2
(45) Date of Patent: Feb. 10, 2026

(54) BATTERY, THERMAL RUNAWAY EARLY-WARNING METHOD AND APPARATUS THEREFOR, AND STORAGE MEDIUM

(71) Applicant: CONTEMPORARY AMPEREX TECHNOLOGY CO., LIMITED, Ningde (CN)

(72) Inventors: Yihua Cai, Ningde (CN); Hui Jia, Ningde (CN); Hang Ma, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/293,001

(22) Filed: Aug. 7, 2025

(65) Prior Publication Data

US 2025/0364618 A1    Nov. 27, 2025

Related U.S. Application Data

(63) Continuation of application No. PCT/CN2023/088405, filed on Apr. 14, 2023.

(51) Int. Cl.
   *H01M 10/48* (2006.01)
   *H01M 10/42* (2006.01)
   *H01M 50/30* (2021.01)

(52) U.S. Cl.
   CPC ....... *H01M 10/482* (2013.01); *H01M 10/425* (2013.01); *H01M 10/486* (2013.01); *H01M 50/394* (2021.01); *H01M 2010/4271* (2013.01)

(58) Field of Classification Search
   None
   See application file for complete search history.

(56) References Cited

U.S. PATENT DOCUMENTS

2020/0251706 A1*  8/2020  Tevene' ............... A62C 3/10
2021/0111443 A1   4/2021  Wang et al.

FOREIGN PATENT DOCUMENTS

| CN | 108519205 A |   | 9/2018  |            |
|----|-------------|---|---------|------------|
| CN | 111129371 A | * | 5/2020  | H01M 50/147 |
| CN | 112615069 A |   | 4/2021  |            |
| CN | 113093022 A |   | 7/2021  |            |
| CN | 113506924 A |   | 10/2021 |            |
| CN | 113659232 A |   | 11/2021 |            |

OTHER PUBLICATIONS

ISR for PCT/CN2023/088405 mailed Dec. 25, 2023.
Written Opinion for PCT/CN2023/088405 mailed Dec. 25, 2023.

* cited by examiner

*Primary Examiner* — Carlos Barcena
(74) *Attorney, Agent, or Firm* — Ladas & Parry, LLP

(57) ABSTRACT

The present application relates to the field of batteries, and provides a battery, a thermal runaway early-warning method and apparatus therefor, and a storage medium. The battery is provided with an accommodating space, the accommodating space is configured to discharge smoke in the event of thermal runaway of a battery cell of the battery, and the method includes: acquiring a detection signal at a detection position including the accommodating space; and generating a thermal runaway early-warning signal according to the detection signal.

14 Claims, 6 Drawing Sheets

BATTERY, THERMAL RUNAWAY EARLY-WARNING METHOD AND APPARATUS THEREFOR, AND STORAGE MEDIUM

CROSS REFERENCE TO RELATED APPLICATIONS

This application is a continuation of International application PCT/CN2023/088405 filed on Apr. 14, 2023, the content of which is incorporated herein by reference in its entirety.

TECHNICAL FIELD

The present application relates to the field of batteries, and in particular, to a battery, a thermal runaway early-warning method and apparatus therefor, and a storage medium.

BACKGROUND

Energy and environmental issues are major challenges confronting all human beings, so establishing a clean and renewable new energy system has become an inevitable choice for human society. With the development of the energy storage technology, the improvement in the energy density of batteries has simultaneously introduced potential chemical instability. When thermal runaway happens to the battery, it may cause major safety accidents such as vehicle spontaneous combustion and energy storage substation fires. How to ensure safety of the battery or get thermal runaway information of the battery in advance has become a critical focus and challenge.

In order to get the thermal runaway information of the battery in time and reserve safe escape time for relevant personnel, a battery pack pressure monitoring sensor can be arranged in a battery pack. The battery pack pressure monitoring sensor is configured to detect changes in the internal air pressure of the battery pack, thereby enabling early sensing of the thermal runaway information of the battery. However, in the designs where an explosion-proof valve of a battery cell faces downward, the battery pack pressure monitoring sensor in the battery pack cannot sense thermal runaway of the battery in time, which is not conducive to reducing the losses caused after thermal runaway of the battery.

SUMMARY OF THE INVENTION

In view of this, embodiments of the present application provide a battery, a thermal runaway early-warning method and apparatus therefor, a device, and a storage medium to solve the problem in the prior art that a battery pack pressure monitoring sensor in a battery pack cannot sense thermal runaway of a battery in time, which is not conducive to reducing the losses caused after thermal runaway of the battery.

A first aspect of the embodiments of the present application provides a thermal runaway early-warning method for a battery, where the battery is provided with an accommodating space, the accommodating space is configured to discharge smoke in the event of thermal runaway of a battery cell of the battery, and the method includes: acquiring a detection signal at a detection position including the accommodating space; and generating a thermal runaway early-warning signal according to the detection signal, so that the thermal runaway early-warning signal can be more reliably generated according to the detection signal at the accommodating space for discharging smoke, thereby reducing the probability of missed early-warning and reducing the losses caused after thermal runaway.

By arranging a sensor for acquiring the detection signal at the accommodating space, when the battery discharges smoke through the accommodating space, the temperature or air pressure at an interlayer may increase. Therefore, the sensor arranged at the accommodating space can timely and effectively detect a change signal of the temperature or air pressure of the battery. When the detected detection signal about the temperature or air pressure meets a preset early-warning condition, the thermal runaway early-warning signal can be generated according to the detection signal. For example, a voice alarm signal, a warning light prompt signal, a text early-warning signal, an image early-warning signal, or the like may be generated. This allows battery users, such as a driver and passengers of an automobile, to have longer time to deal with the situation, such as getting out of the automobile and leaving the scene of an accident, which can effectively reduce the losses caused by thermal runaway of the battery.

In combination with the first aspect, in a first possible implementation mode of the first aspect, the accommodating space includes one or more of an interlayer space of the battery and an internal space of a hollow beam structure of the battery.

The accommodating space is a space for accommodating smoke discharged by the battery. The space may include the interlayer space partitioned by an interlayer structure. The interlayer space may be an interlayer space of a battery module, or may also be an interlayer space of a battery pack. In a possible implementation mode, the accommodating space may also include the internal space of the hollow beam structure in the battery. The hollow beam structure may be arranged in a battery module, or may also be arranged in a battery pack. For example, an interlayer serving as the accommodating space may be arranged at an end of the battery module or battery pack, including an interlayer arranged at a bottom, top or side face of the battery module or battery pack. Alternatively, the interlayer may also be arranged at a middle layer of the battery module or battery pack. When the accommodating space is the hollow beam structure, the hollow beam structure may be arranged at the end, including the bottom, top or side face, of the battery module or battery pack, or may also be arranged in a space in the battery module or battery pack at a preset distance from the end. The arranged accommodating space may be provided with a spray valve, and the smoke in the battery cell may enter the accommodating space through the spray valve. When the concentration of the smoke in the accommodating space reaches a certain degree, an explosion-proof valve in the accommodating space is opened and the smoke is discharged through the explosion-proof valve.

In combination with the first possible implementation mode of the first aspect, in a second possible implementation mode of the first aspect, when the accommodating space includes the interlayer space of the battery, the detection position includes any position within the interlayer space and/or a surface of an inner layer of the interlayer space.

In order to better detect an abnormal state of the battery through the interlayer space, the sensor for acquiring the detection signal may be arranged at any position in the interlayer space, or on the surface of the inner layer of the interlayer space. When a smoke signal of the battery cell enters the interlayer space through the spray valve, the sensor located in the interlayer space can obtain the detection signal, including a temperature signal or an air pressure signal or the like. In a possible implementation mode, when the interlayer space is located at the end or side face of the battery module or battery pack, the detection position may also be located on the surface of the inner layer of the interlayer space, which may include an inner surface and an outer surface of the inner layer. By obtaining the detection signal, including the temperature signal or the air pressure signal or the like, on the surface of the inner layer of the interlayer space, the abnormal state of the battery can be detected in time.

In combination with the first aspect to any one of the second possible implementation modes of the first aspect, in a third possible implementation mode of the first aspect, the detection signal includes a first signal and a second signal; the acquiring a detection signal at a detection position including the accommodating space includes: acquiring the first signal at the detection position including the accommodating space; and when the first signal meets a preset wake-up condition, waking up a battery management system (BMS), and acquiring the second signal by the BMS, where a sampling frequency of the second signal is greater than a sampling frequency of the first signal.

In order to reduce system power consumption, it may be set that the detection signal includes the first signal and the second signal, the detection position of the first signal and the second signal may include the accommodating space. The first signal is acquired when the system is in a sleep state. The first signal is compared with the preset wake-up condition. When it is determined that the first signal meets the wake-up condition, the BMS is waked up to enter a normal working mode, and the second signal at the detection position including the accommodating space is collected. Based on the normal working mode, the second signal is sampled at a higher sampling frequency than the sampling frequency of the first signal. The second signal can be used to perform early-warning analysis of thermal runaway to obtain a more reliable early-warning result. Furthermore, when the first signal does not meet the wake-up condition, the BMS is in the low-power consumption sleep state, which is beneficial to reducing system power consumption and improving the battery life of the BMS.

In combination with the third possible implementation mode of the first aspect, in a fourth possible implementation mode of the first aspect, the first signal includes one or more of a temperature signal and an air pressure signal of which the detection position is located at the accommodating space.

When the battery cell of the battery is in thermal runaway, the discharged smoke may enter the accommodating space. Therefore, when the battery is in thermal runaway, since smoke enters the accommodating space, the air pressure in the accommodating space is caused to increase and the temperature is caused to rise. A temperature sensor and/or air pressure sensor may be arranged in the accommodating space, including the interlayer space or the hollow beam structure, to detect the air pressure signal and/or temperature signal in the accommodating space. In a possible implementation mode, when the battery cell generates smoke, the inner surface of the interlayer space arranged at the end or side face may be affected by the smoke and then increase in temperature, and the detection signal may be acquired through the inner surface of the interlayer space, thereby enabling rapid and effective detection of the abnormal state of the battery.

In combination with the third possible implementation mode of the first aspect, in a fifth possible implementation mode of the first aspect, the first signal further includes one or more of a battery voltage, a balanced circuit board temperature of the battery, and a battery cell temperature of the battery.

The battery voltage may include a battery module voltage or a battery pack voltage. A battery pack may include a plurality of battery modules connected in series, and the battery module may include a plurality of battery cells connected in series. An output voltage of the battery module is the sum of voltages of battery cells connected in series, and an output voltage of the battery pack is the sum of voltages of battery modules. When the voltage of one or more battery cells decreases, the output voltage of the battery module may decrease, and the voltage of the battery pack formed by the battery modules connected in series may also decrease. Therefore, by detecting the output voltage of the battery module or battery pack, the abnormal state of the battery can be detected in time. In addition, when the battery is in a thermal runaway state, the balanced circuit board temperature of the battery and the battery cell temperature of the battery may also become abnormal. By combining the battery cell temperature and the balanced circuit board temperature for detection, the detection accuracy can be effectively improved.

In combination with the third possible implementation mode of the first aspect, in a sixth possible implementation mode of the first aspect, the second signal includes two or more of a temperature signal at the accommodating space, an air pressure signal at the accommodating space, a temperature change rate at the accommodating space, an air pressure change rate at the accommodating space, a battery cell voltage of the battery, a battery cell temperature of the battery, a temperature change rate of the battery cell of the battery, a balanced circuit board temperature of the battery, and a temperature change rate of the balanced circuit board of the battery.

When the battery is in the thermal runaway state and releases a smoke signal, the temperature at the accommodating space, the air pressure at the accommodating space, the temperature of a balanced circuit board, and the temperature of the battery cell may change. By detecting the temperature at the accommodating space, the air pressure at the accommodating space, the temperature of the balanced circuit board, and the temperature of the battery cell, it can be determined whether the currently collected second signal determines that the battery is in the thermal runaway state. In addition, a change rate of the abnormal state of the battery may be determined by state indicators such as the temperature change rate at the accommodating space, the air pressure change rate at the accommodating space, the temperature change rate of the battery cell of the battery, and the temperature change rate of the balanced circuit board of the battery, so as to facilitate timely and effective detection of the thermal runaway state of the battery when the change rate of the abnormal state is high.

In combination with the sixth possible implementation mode of the first aspect, in a seventh possible implementation mode of the first aspect, the generating a thermal runaway early-warning signal according to the detection signal, includes: when two or more signals in the second signal meet a preset early-warning requirement, generating the thermal runaway early-warning signal.

In order to improve the detection accuracy of the thermal runaway state of the battery, it can be set that when at least any two signals in the second signal are abnormal, the thermal runaway early-warning signal is generated. By setting two or more indicators for joint detection and determination, the probability of false alarms caused when an individual signal is inaccurate can be reduced. For example, when the temperature signal detected by the temperature sensor may contain a noise signal, the detected battery cell temperature may meet a determination condition of thermal runaway. Through joint determination with other indicators, when other indicators are all normal, early-warning may be suspended, which can effectively reduce the probability of false detection, thereby improving the detection accuracy of the thermal runaway state of the battery.

In combination with the third possible implementation mode of the first aspect to the seventh possible implementation mode of the first aspect, in an eighth possible implementation mode of the first aspect, the acquiring a detection signal at a detection position including the accommodating space includes monitoring the first signal through a monitor with a host wake-up function; and when the first signal meets the preset wake-up condition, waking up the BMS through the monitor to enter the normal working mode from a sleep mode, and acquiring the second signal by the BMS in the normal working mode.

The monitor may include two working modes, namely, the sleep mode and the normal working mode. In the sleep mode, the monitor can collect two different state signals, namely, a heartbeat signal and a fault tone signal. The heartbeat signal is a signal when the battery is in normal working, and fault tone is a signal when the battery is in the abnormal state. When the monitor monitors the fault tone signal, a level of a pin may be triggered to change, for example, the pin is triggered to be in a high level state. The change of the level of the pin can trigger the BMS to enter the normal working mode from the low-power consumption sleep mode, and collect the second signal in the normal working mode. When the battery is in a normal state, the monitor and the BMS may be in the sleep mode.

In combination with the third possible implementation mode of the first aspect to the seventh possible implementation mode of the first aspect, in a ninth possible implementation mode of the first aspect, the acquiring a detection signal at a detection position including the accommodating space includes: sampling the first signal through a sampling controller in the low-power consumption mode; and when the first signal meets the preset wake-up condition, waking up the BMS through the sampling controller to enter a normal working mode, switching the sampling controller from the low-power consumption mode to a normal working mode, and controlling the sampling controller by the BMS to acquire the second signal in the normal working mode.

When a sampler does not support reverse wake-up of the BMS, the sampled first signal may be obtained through the sampling controller in the low-power consumption mode. When the first signal meets the preset wake-up condition, the sampling controller wakes up the BMS to enter the normal working mode. The sampling controller switches from the low-power consumption mode to a normal working mode, and the BMS controls the sampling controller to collect a signal in the normal working mode to obtain the second signal. The sampling frequency of the second signal collected in the normal working mode is higher than the sampling frequency of the first signal collected in the sleep mode, so that a more accurate and timely sampling signal can be obtained, thereby improving the accuracy and timeliness of data detection and determination.

In combination with the third possible implementation mode of the first aspect to the seventh possible implementation mode of the first aspect, in a tenth possible implementation mode of the first aspect, the acquiring a detection signal at a detection position including the accommodating space includes comparing the first signal with a preset threshold signal; and when the comparison result meets the preset wake-up condition, triggering the BMS to enter a normal working mode from a sleep mode, and controlling a sampler by the BMS to acquire the second signal in the normal working mode.

In order to reduce the system cost, the BMS may be triggered by a comparator to switch from the sleep mode to the working mode. An input end of the comparator can receive a reference signal and the detection signal, and according to a comparison result between the detection signal and the reference signal, the comparator is caused to output different signals. The BMS controls switching of the state of the BMS according to the different signals output by the comparator. For example, when the detection signal is a signal indicating that the battery is in the normal state, a control signal output by the comparator may cause the BMS to be in the sleep mode. When the detection signal is a signal indicating that the battery is in the abnormal state, the control signal output by the comparator may cause the BMS to be in the normal working mode, so that the second signal can be collected at a higher sampling frequency.

In combination with the third possible implementation mode of the first aspect to the seventh possible implementation mode of the first aspect, in an eleventh possible implementation mode of the first aspect, when battery cells of the battery are connected in parallel, the first signal includes an air pressure signal and/or a temperature signal, and a collection position of the air pressure signal and/or the temperature signal includes the accommodating space.

When the battery cells in the battery module are connected in parallel, or the battery modules in the battery pack are connected in parallel, when one of the associated battery cells becomes abnormal, the impact on a detected voltage is very small, and it is not easy to determine whether the battery is in the thermal runaway state through the detected voltage. In this case, in order to improve the accuracy of detection, the detection signal, of which the detection position may include the accommodating space, of the first signal includes the air pressure signal and/or the temperature signal at the accommodating space. The accuracy of a detection result of the thermal runaway state of the battery is improved by the air pressure signal and/or the temperature signal collected at the accommodating space.

A second aspect of the embodiments of the present application provides a thermal runaway early-warning apparatus for a battery, where the battery is provided with an accommodating space, the accommodating space is configured to discharge smoke in the event of thermal runaway of a battery cell of the battery, and the apparatus includes: a detection signal acquiring unit, configured to acquire a detection signal at a detection position including the accommodating space; and an early-warning unit, configured to generate a thermal runaway early-warning signal according to the detection signal.

In a third aspect, the embodiments of present application provide a battery, including: a memory, a processor, and a computer program stored in the memory and runnable in the processor, where when executing the computer program, the processor implement steps of the method according to any one of the first aspect.

In a fourth aspect, the embodiments of present application provide a computer-readable storage medium, the computer-readable storage medium storing a computer program, where when executed by a processor, the computer program implement steps of the method according to any one of the first aspect.

It can be understood that the beneficial effects of the second aspect to the fourth aspect mentioned above can refer to the relevant description of the first aspect mentioned above, and will not be repeated here.

DESCRIPTION OF DRAWINGS

In order to more clearly describe technical solutions of embodiments of the present application, drawings to be used in the description of the embodiments or the prior art will be briefly introduced below. Apparently, the drawings described below show merely some embodiments of the present application. For persons of ordinary skills in the art, other drawings may also be obtained based on these drawings without creative work.

DETAILED DESCRIPTION

In the following description, for the purpose of explanation rather than limitation, specific details such as specific system structures and technologies are provided to facilitate thoroughly understanding embodiments of the present application. However, it will be apparent to persons skilled in the art that the present application may also be implemented in other embodiments without these specific details. In other instances, detailed descriptions of well-known systems, apparatuses, circuits, and methods are omitted so that unnecessary details do not hinder the description of the present application.

In order to explain the technical solutions described in the present application, the following is illustrated by means of specific embodiments.

In order to ensure the safety of use of a battery and improve the accuracy of detecting a thermal runaway state of the battery, it is necessary to monitor thermal runaway of the battery. For example, a battery pack pressure monitoring sensor is arranged in a battery pack to detect changes of an air pressure in the battery pack. With the development of the technology, in order to increase the energy density in a limited space, an explosion-proof valve of a battery cell of the battery is usually arranged downward so that smoke can be sprayed out from a bottom spray valve when the battery cell has thermal runaway. In this case, the pressure sensor arranged in a battery module in the battery pack or in the battery pack may not be able to detect the abnormality through the battery module or battery pack pressure monitoring sensor or a smoke sensor, which is not conducive to timely detecting a thermal runaway state of the battery and not conducive to reducing the losses caused after thermal runaway of the battery.

In order to solve the problems mentioned above, an embodiment of the present application provides a thermal runaway early-warning method for a battery. By means of the method, early-warning to thermal runaway of the battery can be given timely and effectively, thereby reducing the losses caused by thermal runaway of the battery.

Figure 1:
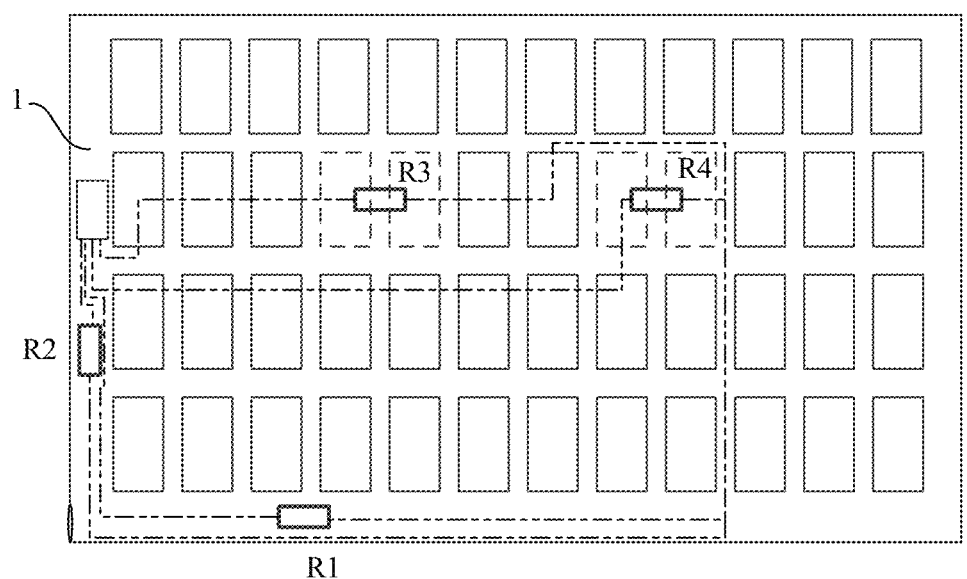
FIG. 1 is a top view when temperature sensors are arranged at an interlayer according to an embodiment of the present application.

In the embodiment of the present application, a first sensor for detecting thermal runaway for early-warning may include one or more of a temperature sensor, an air pressure sensor or a voltage sensor. An accommodating space in the embodiment of the present application may include an interlayer space at an end or side of a battery module or battery pack, or may also include an internal space of a hollow beam structure in the battery module or battery pack. FIG. 1 is a top view when temperature sensors are arranged at an interlayer space according to an embodiment of the present application. As shown in FIG. 1, a plurality of temperature sensors, namely R1, R2, R3, and R4, are arranged at the interlayer space at a bottom of a battery 1. The temperature sensors transmit collected temperature signals to a battery management system (BMS). The BMS does not have to be limited to a conventional BMS, but may also include a vehicle controller or a motor controller or the like that integrates the functions of the BMS. FIG. 1 only illustrates the temperature sensors arranged at four positions. According to the requirements of detection accuracy, a larger number of temperature sensors may be arranged, or a smaller number of temperature sensors may be arranged. Each of the temperature sensors may be a thermistor. By detecting a resistance value of the thermistor, a temperature at the thermistor can be determined by looking up a table. Based on the acquired temperature, it can be used to wake up the BMS, or after waking up the BMS, it can be used to determine whether to generate an early-warning signal.

Figure 2:
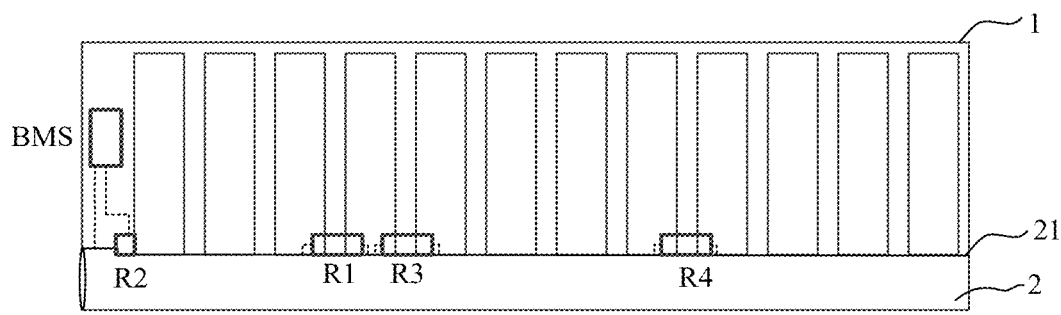
FIG. 2 is a side view when temperature sensors are arranged at the interlayer according to an embodiment of the present application.

FIG. 2 is a side view when temperature sensors are arranged at the interlayer space according to an embodiment of the present application. As shown in FIG. 2, when the temperature sensors are arranged on an upper surface of an upper cover 21 of an interlayer space 2 at the bottom of the battery 1 (when the interlayer space is located at a top, the temperature sensors may be arranged on a lower surface of a lower cover of the top interlayer space), the temperature sensors R1, R2, R3, and R4 transmit collected temperature signals to the BMS. When a battery cell of the battery experiences thermal runaway, smoke is sprayed into the interlayer space through a spray valve at a bottom of the battery cell, causing the upper cover of the interlayer space to heat up. A change of the temperature is detected by the temperature sensor arranged at the upper cover of the interlayer space, thereby facilitating waking up the BMS according to the detected temperature, or generating, based on the detected temperature, an early-warning signal.

Figure 3:
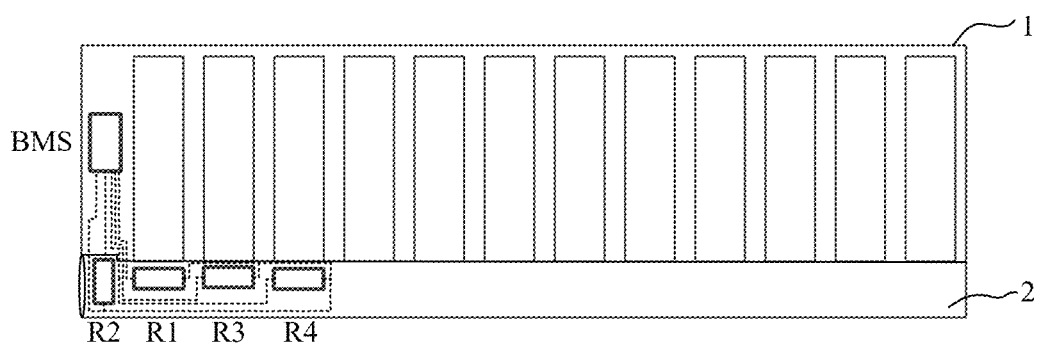
FIG. 3 is a side view when another temperature sensors are arranged at the interlayer according to an embodiment of the present application.

FIG. 3 is a side view when another temperature sensors are arranged at the interlayer space 2 according to an embodiment of the present application; As shown in FIG. 3, the temperature sensors are arranged in the interlayer space 2 at the bottom of the battery 1, and the temperature sensors R1, R2, R3, and R4 transmit collected temperature signals to the BMS. When a battery cell of the battery experiences thermal runaway, smoke is sprayed into the interlayer space through a spray valve at a bottom of the battery cell. Therefore the temperature sensors arranged in the interlayer space can timely and effectively detect the change of a temperature in the interlayer space. Based on the detected temperature, the BMS is waked up, or an early-warning signal is generated based on the detected temperature.

In order to improve the detection accuracy of the temperature sensor, when the temperature sensor is arranged in the interlayer space, the temperature sensor may be arranged at a position close to an explosion-proof valve of the interlayer space. By means of the temperature sensor arranged at the explosion-proof valve, the change of the temperature in the interlayer space can be detected more quickly and effectively. For example, when the explosion-proof valve is opened, the temperature sensor arranged at the interlayer space can more effectively detect the state of the explosion-proof valve than temperature sensors arranged at other positions.

It is understandable that the temperature sensor is not limited to being arranged solely in the interlayer space or solely on the surface of the upper cover of the interlayer space. The temperature sensor can be arranged simultaneously in the interlayer space and on the upper cover of the interlayer space (such as the upper surface of the interlayer space). The thermal runaway early-warning signal is generated by a detection signal at a detection position including the interlayer space, thereby improving the accuracy and timeliness of the thermal runaway early-warning signal.

In a possible implementation mode, a first signal for thermal runaway early-warning may also include signals such as a battery cell voltage of the battery, a balanced circuit board temperature, and a module temperature, to assist in determining whether the battery is in a thermal runaway state. For example, when it is detected that a voltage in the battery is less than a preset voltage threshold, the battery is in an undervoltage state, and the BMS can be waked up to enter a continuous working state and determine, based on the collected signal, whether to generate thermal runaway early-warning. Specific wake-up modes are described below separately according to different embodiments.

Embodiment 1

Figure 4:
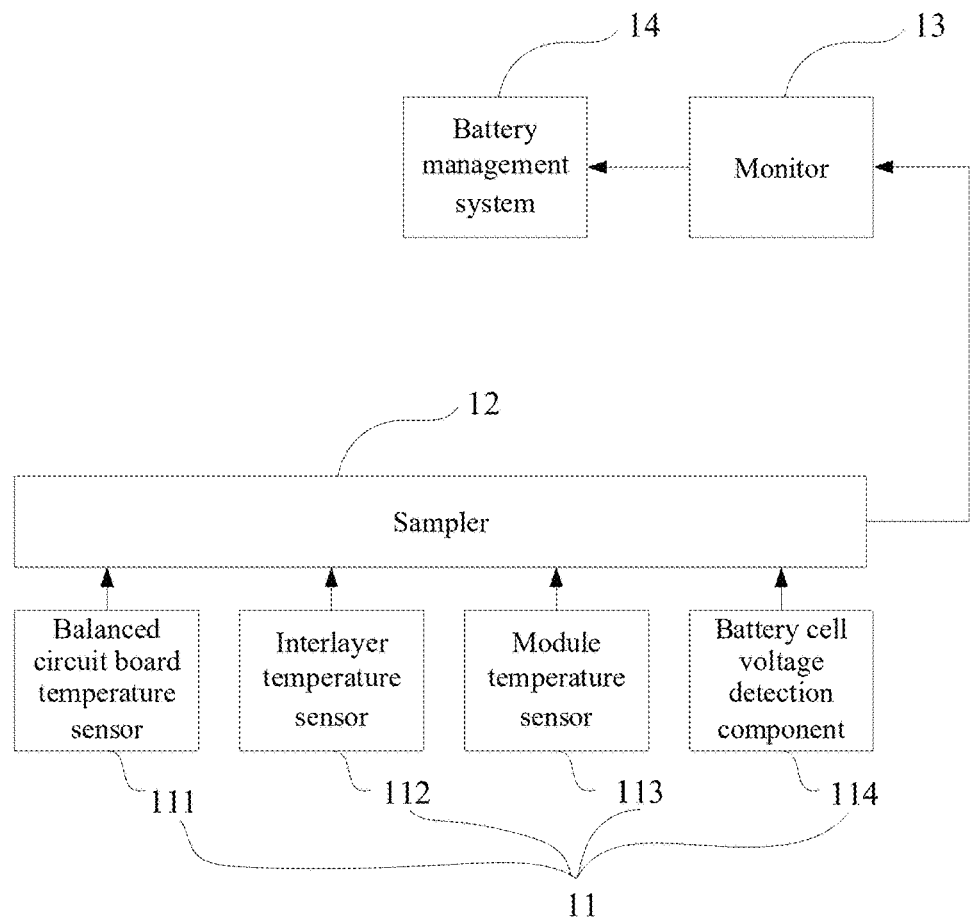
FIG. 4 is a schematic view of a circuit structure for thermal runaway early-warning of a battery according to an embodiment of the present application.

FIG. 4 is a schematic view of a circuit structure for thermal runaway early-warning of a battery according to an embodiment of the present application. As shown in FIG. 4, the circuit structure includes a sensing module 11, a sampler 12 with a reverse wake-up function, a monitor 13, and a BMS 14. The sensing module includes but is not limited to a balanced circuit board temperature sensor 111, an interlayer temperature sensor 112, a module temperature sensor 113, and a battery cell voltage detection component 114. Without being limited thereto, the sensors used may include a single sensor, two sensors, or more than two sensors therein.

The balanced circuit board temperature sensor 111 is configured to collect a balanced circuit board temperature Tb, and the interlayer temperature sensor 112 is configured to detect an interlayer space temperature Tg. The module temperature sensor 113 is configured to collect a temperature Tc of a battery module. In a possible implementation mode, when the detected object is a battery pack, a battery pack temperature sensor may also be included. The battery cell voltage detection component 114 is configured to detect a battery cell voltage Vc of the battery module. The sampler 12 can receive sensing signals collected by the balanced circuit board temperature sensor 111, the interlayer temperature sensor 112, the module temperature sensor 113, and the battery cell voltage detection component 114 in a sleep mode, and determine whether the collected sensing signals are abnormal. For example, the sampler 12 can compare the collected balanced circuit board temperature Tb, interlayer space temperature Tg, battery module temperature Tc, and battery cell voltage Vc of the battery module with a corresponding balanced circuit board temperature threshold Ttb, interlayer space temperature threshold Ttg, module temperature threshold Ttc, and battery cell voltage Vtc of the battery, respectively. According to comparison results, it is determined whether it is necessary to generate a wake-up identifier to wake up the monitor 13.

The monitor 13 is configured to convert the wake-up identifier into a wake-up signal so that the converted wake-up signal can be recognized by the BMS 14. For example, the wake-up identifier can be converted into a serial peripheral interface (SPI) communication protocol-based wake-up signal, or a universal asynchronous receiver/transmitter (UART) communication protocol-based wake-up signal. The monitor 13 is configured to provide a communication interface for communication with the sampler 12. When the sampler 12 detects an abnormal signal indicating that the battery may be in the thermal runaway state, the monitor 13 is waked up through the communication interface.

A plurality of samplers 12 may be arranged to monitor the collected sensing signals, and through the daisy-chained circuit structure, by means of the communication interface provided by the monitor 13, the wake-up identifier determined through an abnormal sensing signal may be transmitted to the monitor 13 through a daisy chain. After the wake-up identifier is converted and processed by the monitor 13, the wake-up signal is generated and sent to the BMS 14 so as to wake up the BMS 14 and cause the BMS to enter a continuous working mode. The BMS may include any controller that integrates the functions of the BMS, including, such as, a vehicle controller or a motor controller.

In the continuous working mode, the BMS increases a sampling frequency and determines, based on a sampled signal, whether to generate an early-warning signal, thereby reducing the losses according to the early-warning signal. For example, for an early-warning signal of a vehicle battery, based on the early-warning signal, passengers can be notified to leave a vehicle.

Figure 5:
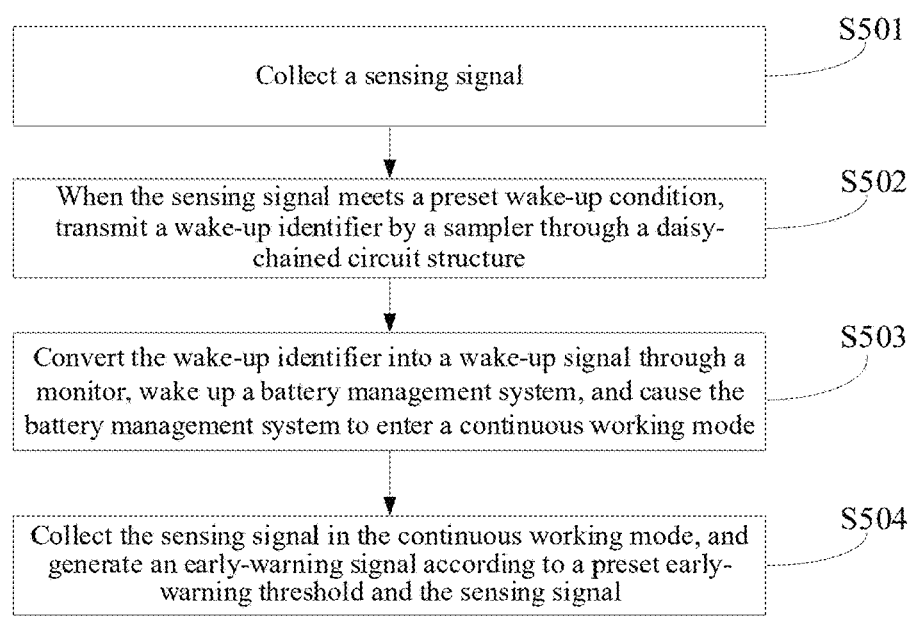
FIG. 5 is a schematic flowchart of implementation of a thermal runaway early-warning method for a battery according to an embodiment of the present application.

FIG. 5 is a schematic flowchart of implementation of a thermal runaway early-warning method for a battery according to an embodiment of the present application. As shown in FIG. 5, the flow includes:

S501: Collect a sensing signal.

The sensing signal collected in the embodiment of the present application includes one or more signals such as a balanced circuit board temperature Tb, an interlayer space temperature Tg, a battery module temperature Tc, and a battery cell voltage Vc of a battery module. The interlayer space temperature includes a temperature collected by the temperature sensor arranged in the interlayer space, or may also include a temperature collected by the temperature sensor arranged on the upper surface of the upper cover of the interlayer space at the bottom.

S502: When the sensing signal meets a preset wake-up condition, transmit a wake-up identifier by a sampler through a daisy-chained circuit structure.

The sensing signal collected by a sensing component is received by the sampler, and the received sensing signal is compared with a corresponding threshold to determine whether the received sensing signal is abnormal. When abnormality occurs, through the daisy-chained circuit structure, the wake-up identifier generated when abnormality occurs may be transmitted to a monitor through a communication interface of the monitor.

The sampler can be in a low-power consumption sleep state during sampling and detection to reduce the power consumption of the BMS.

S503: Convert the wake-up identifier into a wake-up signal through the monitor, wake up the BMS, and cause the BMS to enter a continuous working mode.

After receiving the wake-up identifier through the communication interface, the monitor can convert the wake-up identifier into the wake-up signal that can be recognized by the BMS. The wake-up signal may be an SPI protocol-based wake-up signal or an UART protocol-based wake-up signal.

The BMS is waked up after receiving the wake-up signal, and the BMS enters the continuous working mode.

S504: Collect the sensing signal in the continuous working mode, and generate an early-warning signal according to a preset early-warning threshold and the sensing signal.

In the continuous working mode, the BMS collects the sensing signal by increasing the sampling frequency. The collected sensing signal includes but is not limited to one or more of a temperature at the interlayer space, a battery cell voltage of the battery, a change rate of the temperature at the interlayer space, a change rate of the battery cell voltage of the battery, a module temperature, a change rate of the module temperature, a balanced circuit board temperature, and a change rate of the balanced circuit board temperature.

When the collected sensing signal includes the temperature at the interlayer space, the battery cell voltage of the battery, the change rate of the temperature at the interlayer space, the change rate of the battery cell voltage of the battery, the module temperature, the change rate of the module temperature, the balanced circuit board temperature, and the change rate of the balanced circuit board temperature, the collected sensing signal can be compared with a corresponding threshold to determine whether the battery state is abnormal. When two of them are abnormal, the early-warning signal can be generated so that the thermal runaway abnormality of the battery can be promptly addressed. By setting the generation of the early-warning signal when two or more items are abnormal, the accuracy of generating the early-warning signal can be improved and a false alarm rate can be reduced.

It is not limited to generating the early-warning signal when it is determined that two or more of the sensing signals are abnormal, and it can also be set that the early-warning signal is generated when any one of them is abnormal.

Embodiment 2

Figure 6:
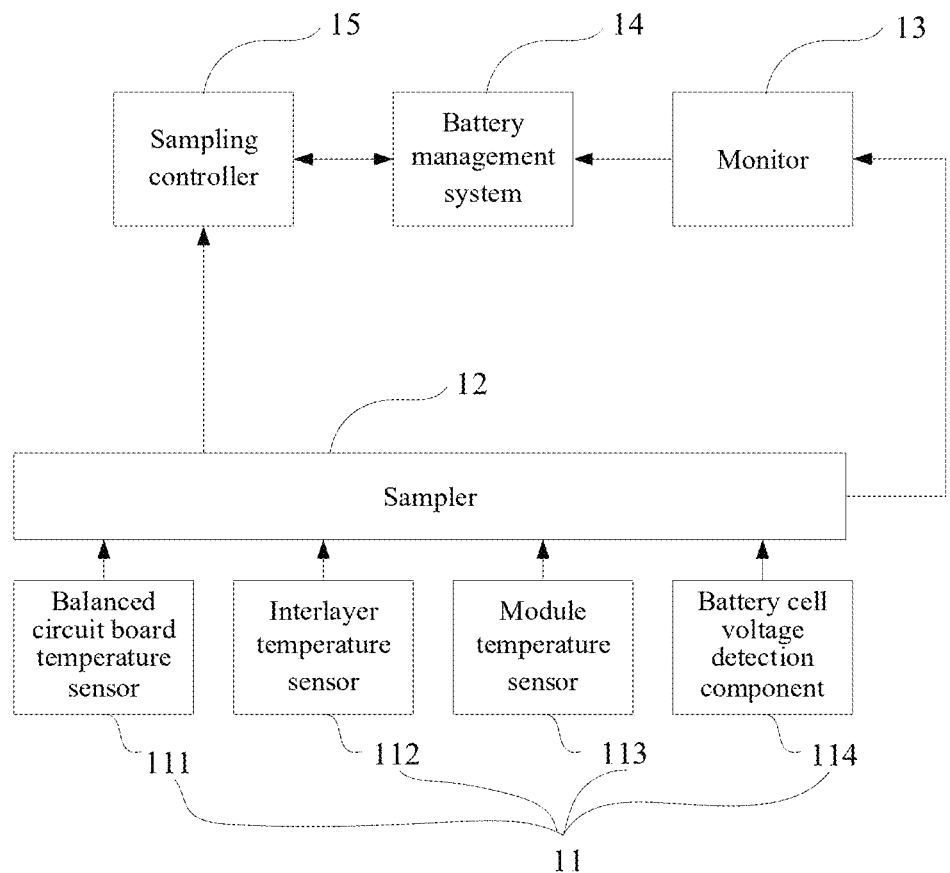
FIG. 6 is a schematic view of another circuit structure for thermal runaway early-warning of a battery according to an embodiment of the present application.

FIG. 6 is a schematic view of another circuit structure for thermal runaway early-warning of a battery according to an embodiment of the present application. As shown in FIG. 6, the circuit structure includes a sensing module 11, a sampler 12 without a reverse wake-up function, a monitor 13, a BMS 14, and a sampling controller 15. The sensing module 11 includes but is not limited to a balanced circuit board temperature sensor 111, an interlayer temperature sensor 112, a module temperature sensor 113, and a battery cell voltage detection component 114. Without being limited thereto, the sensors used may include a single sensor, two sensors, or more than two sensors therein.

The balanced circuit board temperature sensor 111 is configured to collect a balanced circuit board temperature Tb, the interlayer temperature sensor 112 is configured to detect an interlayer space temperature Tg, the module temperature sensor 113 is configured to collect a module temperature Tc, and the battery cell voltage detection component 114 is configured to detect a battery cell voltage Vc of a battery module. The sampler 12 can receive sensing signals collected by the balanced circuit board temperature sensor 111, the interlayer temperature sensor 112, the module temperature sensor 113, and the battery cell voltage detection component 114 in a sleep mode, and send the collected sensing signals to the sampling controller 15. The sampling controller 15 determines whether the collected sensing signals are abnormal. For example, the sampling controller 15 can compare the collected balanced circuit board temperature Tb, interlayer space temperature Tg, battery module temperature Tc, and battery cell voltage Vc of the battery module with a corresponding balanced circuit board temperature threshold Ttb, interlayer space temperature threshold Ttg, module temperature threshold Ttc, and battery cell voltage Vtc of the battery, respectively. According to comparison results, it is determined whether it is necessary to wake up the BMS 14 and causes the same to enter a continuous working mode.

The monitor 13 is configured to convert a transmission signal transmitted by a daisy chain into a signal that can be recognized by the sampling controller. For example, the sensing signal can be converted into an SPI communication protocol-based wake-up signal, or an UART communication protocol-based wake-up signal. The monitor 13 is configured to provide a communication interface for communication with the BMS 14. When the sampling controller 15 detects an abnormal signal indicating that the battery may be in a thermal runaway state, the sampling controller 15 wakes up the BMS and causes the same to enter the continuous working mode.

A plurality of samplers 12 may be arranged to collect the sensing signal, and the sensing signal may be transmitted to the sampling controller 15 through the daisy-chained circuit structure. The sampling controller 15 determines whether the sensing signal is abnormal by comparing the sensing signal with a corresponding threshold. When the sensing signal is abnormal, the BMS 14 is waked up and caused to enter the continuous working mode.

In the continuous working mode, the BMS 14 may increase a sampling frequency and determines, based on a sampled signal, whether to generate an early-warning signal, thereby reducing the losses according to the early-warning signal. For example, for an early-warning signal of a vehicle battery, based on the early-warning signal, passengers can be notified to leave a vehicle.

Figure 7:
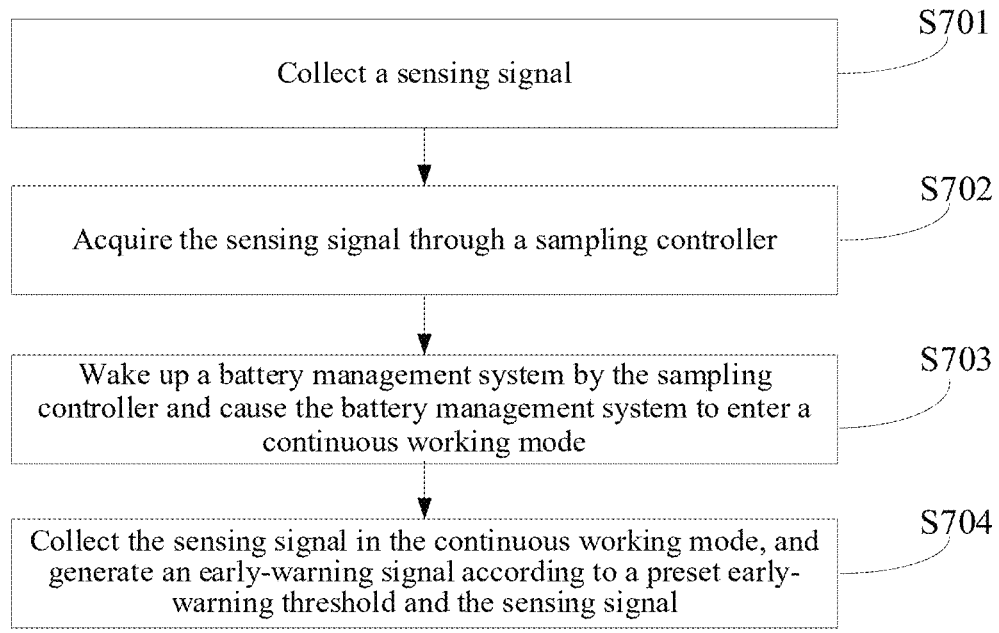
FIG. 7 is a schematic flowchart of implementation of another thermal runaway early-warning method for a battery according to an embodiment of the present application.

FIG. 7 is a schematic flowchart of implementation of a thermal runaway early-warning method for a battery according to an embodiment of the present application. As shown in FIG. 7, the flow includes:

S701: Collect a sensing signal.

The sensing signal collected in the embodiment of the present application includes one or more signals such as a balanced circuit board temperature Tb, an interlayer space temperature Tg, a battery module temperature Tc, and a battery cell voltage Vc of a battery module. The interlayer space temperature includes a temperature collected by the temperature sensor arranged in the interlayer space, or may also include a temperature collected by the temperature sensor arranged on the upper surface of the upper cover of the interlayer space at the bottom.

S702: Acquire the sensing signal through a sampling controller.

When the sensing signal collected by a sensing component is received by a sampler, the sensing signal may be transmitted to the sampling controller through a daisy-chained circuit structure, or the sensing signal collected by the sensing module may be directly obtained. The received sensing signal is compared with a corresponding threshold through the sampling controller to determine whether the received sensing signal is abnormal. When abnormality occurs, a wake-up signal may be generated.

In a normal operating state, the power consumption of the sampling controller is much smaller than the power consumption of an MCU of a BMS. Therefore, by analyzing and determining the sensing signal through the sampling controller, the MCU of the BMS is reversely waked up when abnormality occurs, thereby effectively reducing the power consumption of the BMS.

S703: Wake up the BMS by the sampling controller and cause the BMS to enter a continuous working mode.

Through analysis and comparison by the sampling controller, it is determined whether the detected sensing signal is abnormal. If there is abnormality, the MCU of the BMS is waked up, and the BMS is caused to enter the continuous working mode.

S704: Collect the sensing signal in the continuous working mode, and generate an early-warning signal according to a preset early-warning threshold and the sensing signal.

In the continuous working mode, the BMS collects the sensing signal by increasing the sampling frequency. The collected sensing signal includes but is not limited to one or more of a temperature at the interlayer space, a battery cell voltage of the battery, a change rate of the temperature at the interlayer space, a change rate of the battery cell voltage of the battery, a module temperature, a change rate of the module temperature, a balanced circuit board temperature, and a change rate of the balanced circuit board temperature.

When the collected sensing signal includes the temperature at the interlayer space, the battery cell voltage of the battery, the change rate of the temperature at the interlayer space, the change rate of the battery cell voltage of the battery, the module temperature, the change rate of the module temperature, the balanced circuit board temperature, and the change rate of the balanced circuit board temperature, the collected sensing signal can be compared with a corresponding threshold to determine whether the battery state is abnormal. When two of them are abnormal, the early-warning signal can be generated so that the thermal runaway abnormality of the battery can be promptly addressed. By setting the generation of the early-warning signal when two or more items are abnormal, the accuracy of generating the early-warning signal can be improved and a false alarm rate can be reduced.

It is not limited to generating the early-warning signal when it is determined that two or more of the sensing signals are abnormal, and it can also be set that the early-warning signal is generated when any one of them is abnormal.

Embodiment 3

Figure 8:
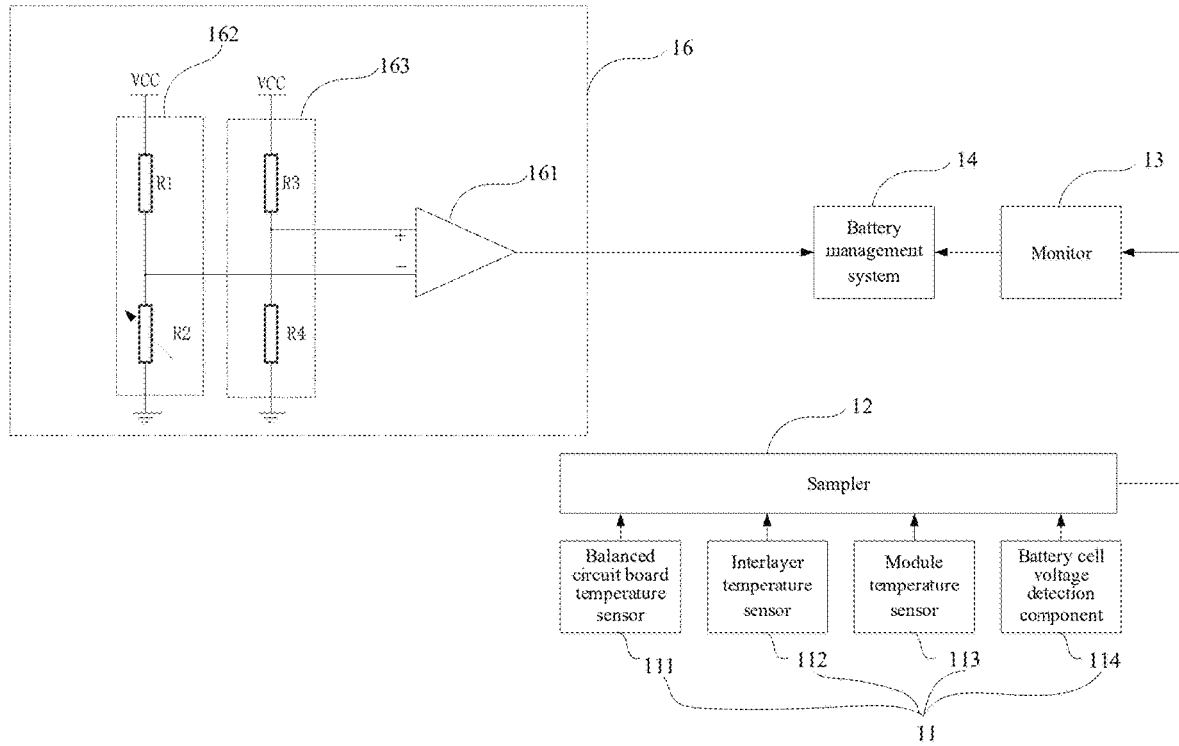
FIG. 8 is a schematic view of a still another circuit structure for thermal runaway early-warning of a battery according to an embodiment of the present application.

FIG. 8 is a schematic view of a still another circuit structure for thermal runaway early-warning of a battery according to an embodiment of the present application. As shown in FIG. 8, the circuit structure includes a sensing module 11, a sampler 12, a monitor 13, a BMS 14, and a comparison module 16, where the sensing module 11 includes but is not limited to a balanced circuit board temperature sensor 111, an interlayer temperature sensor 112, a module temperature sensor 113, and a battery cell voltage detection component 114. Without being limited thereto, the sensors used may include a single sensor, two sensors, or more than two sensors therein.

As shown in FIG. 8, the comparison module 16 includes a comparator 161, a first voltage dividing circuit 162, and a second voltage dividing circuit 163. The first voltage dividing circuit 162 includes a first constant resistor R1 and a thermistor R2, and the second voltage dividing circuit 163 includes a second constant resistor R3 and a third constant resistor R4. A constant resistance end of the first voltage dividing circuit 162 is connected to a power supply, and a thermistor end thereof is connected to the ground. Without being limited thereto, the constant resistance end may be connected to the ground, and the thermistor end may be connected to the power supply.

A connection point of the two resistors in the voltage dividing circuit is a selected node of an input voltage of the comparator. That is, the selected node in the first voltage dividing circuit 162 is the connection point between the first constant resistor R1 and the thermistor R2, and the selected node in the second voltage dividing circuit 163 is the connection point between the second constant resistor R3 and the third constant resistor R4.

When the constant resistor is connected to the power supply and the thermistor is connected to the ground, if the temperature at the position where the thermistor is arranged rises, the resistance value of the thermistor decreases, and a first voltage at the selected node of the voltage dividing circuit decreases. A second voltage of the voltage dividing node determined by the second constant resistor R3 and the third constant resistor R4 is a constant value. That is, the first voltage input to a first input end of the comparator may decrease as the temperature rises, and the second voltage input to a second input end is a constant value. The second voltage at the second input end is used as a reference value. When the first voltage changes from being greater than the second voltage to being less than the second voltage, the comparison result changes, and the temperature change at an installation position of the thermistor is monitored by the change of the comparison result of the comparator.

When the temperature at the installation position of the thermistor rises, an output result of the comparator changes. When the BMS detects the change signal, an MCU of the BMS enters a continuous working mode from a sleep mode, thereby increasing the acquisition frequency of the sensing signal. The sensing signal collected by the sensing module may be transmitted to the sampler through the daisy-chained circuit structure, transmitted to the monitor through a communication interface, and then transmitted to the BMS after being converted and processed by the monitor.

The input voltage of the comparator is not limited to the voltage at the voltage dividing node of the thermistor, but may also include the battery cell voltage of the battery.

The sensing signals detected by the sensing module include a balanced circuit board temperature Tb detected by the balanced circuit board temperature sensor, an interlayer space temperature Tg detected by the interlayer temperature sensor, a module temperature Tc detected by the module temperature sensor, and a battery cell voltage Vc of a battery module detected by the battery cell voltage detection component.

In the continuous working mode, the BMS may increase a sampling frequency and determines, based on a sampled signal, whether to generate an early-warning signal, thereby reducing the losses according to the early-warning signal. For example, for an early-warning signal of a vehicle battery, based on the early-warning signal, passengers can be notified to leave a vehicle.

Figure 9:
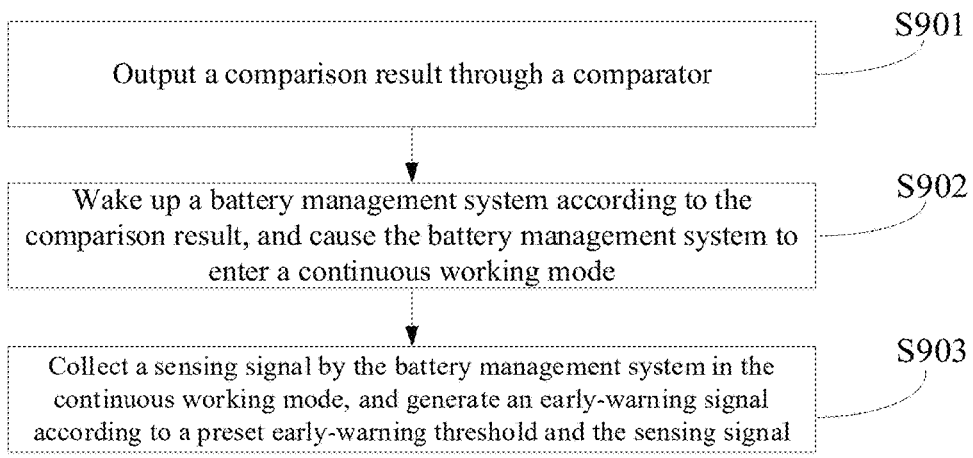
FIG. 9 is a schematic flowchart of implementation of a still another thermal runaway early-warning method for a battery according to an embodiment of the present application.

FIG. 9 is a schematic flowchart of implementation of a thermal runaway early-warning method for a battery according to an embodiment of the present application. As shown in FIG. 9, the flow includes:

S901: Output a comparison result through a comparator.

The comparator in the embodiment of the present application includes a first input end and a second input end. The first input end is configured to input a detection signal, and the second input end is configured to input a reference signal. A constant resistor may be selected to construct a voltage dividing circuit, and a voltage at a voltage dividing node of the voltage dividing circuit is used as the reference signal at the second input end. An input voltage of the second input end can be determined according to a change threshold to be monitored, so that when an input voltage of the first input end is less than or greater than the input voltage, a corresponding sensing signal value serves as a trigger condition for entering a continuous working mode.

A thermistor and a constant resistor may be connected in series to form the voltage dividing circuit, and a joint between the two is used as the voltage dividing node. A temperature change at the interlayer space of the battery can be monitored according to the voltage change of the voltage dividing node.

Alternatively, a battery cell voltage of the battery may be input to the first input end of the comparator, and in the thermal runaway state, the battery cell voltage of the battery decreases. When the battery cell voltage of the battery is less than the reference voltage of the second input end, the output result of comparison changes.

S902: Wake up a BMS according to a comparison result, and cause the BMS to enter the continuous working mode.

Through analysis and comparison by the comparator, it is determined whether the detected sensing signal is abnormal. If there is abnormality, the BMS is waked up, and the BMS is caused to enter the continuous working mode.

S903: Collect the sensing signal by the BMS in the continuous working mode, and generate an early-warning signal according to a preset early-warning threshold and the sensing signal.

In the continuous working mode, the BMS collects the sensing signal by increasing the sampling frequency. The collected sensing signal includes but is not limited to one or more of a temperature at the interlayer space, a battery cell voltage of the battery, a change rate of the temperature at the interlayer space, a change rate of the battery cell voltage of the battery, a module temperature, a change rate of the module temperature, a balanced circuit board temperature, and a change rate of the balanced circuit board temperature.

When the collected sensing signal includes the temperature at the interlayer space, the battery cell voltage of the battery, the change rate of the temperature at the interlayer space, the change rate of the battery cell voltage of the battery, the module temperature, the change rate of the module temperature, the balanced circuit board temperature, and the change rate of the balanced circuit board temperature, the collected sensing signal can be compared with a corresponding threshold to determine whether the battery state is abnormal. When two of them are abnormal, the early-warning signal can be generated so that the thermal runaway abnormality of the battery can be promptly addressed. By setting the generation of the early-warning signal when two or more items are abnormal, the accuracy of generating the early-warning signal can be improved and a false alarm rate can be reduced.

It is not limited to generating the early-warning signal when it is determined that two or more of the sensing signals are abnormal, and it can also be set that the early-warning signal is generated when any one of them is abnormal.

Embodiment 4

Figure 10:
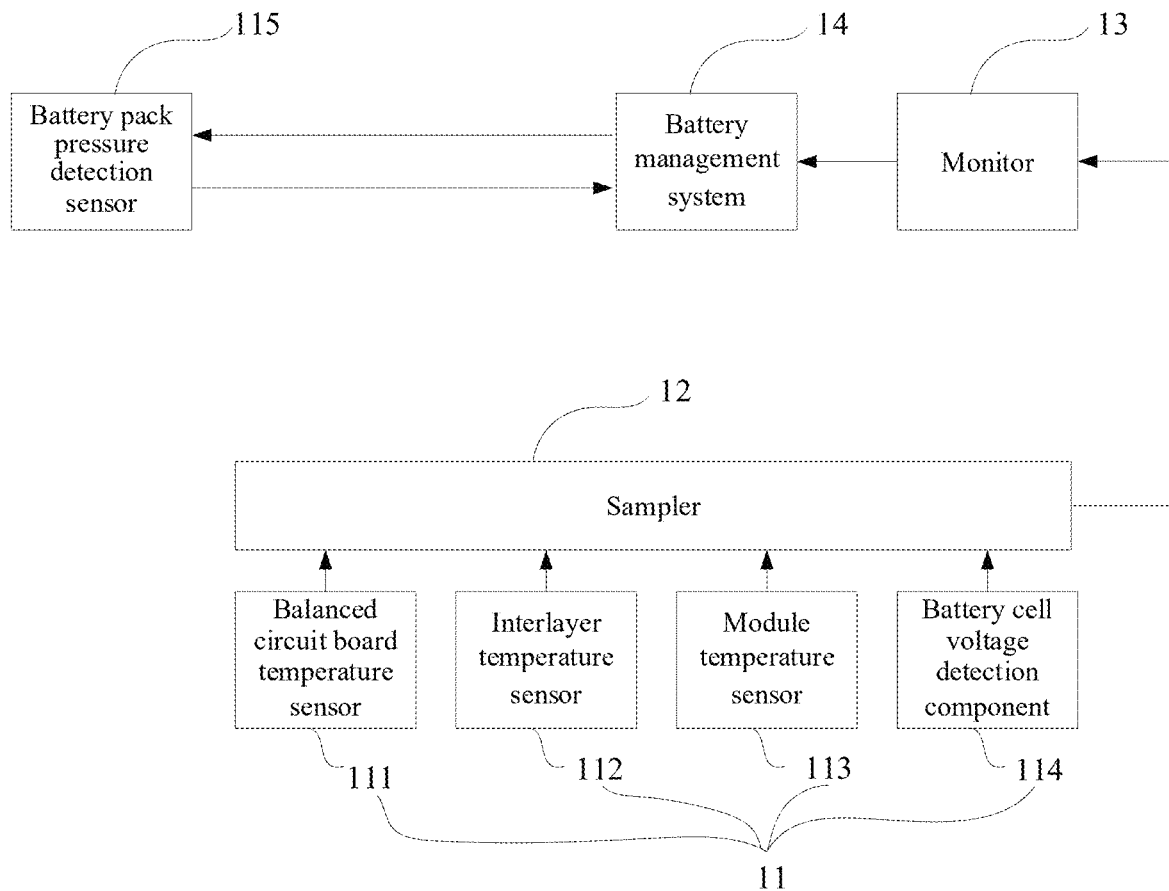
FIG. 10 is a schematic view of a yet another circuit structure for thermal runaway early-warning of a battery according to an embodiment of the present application.

FIG. 10 is a schematic view of a circuit structure for thermal runaway early-warning of a battery according to an embodiment of the present application. As shown in FIG. 10, the circuit structure includes a sensing module 11, a sampler 12 with a reverse wake-up function, a monitor 13, and a BMS 14. The sensing module includes but is not limited to a balanced circuit board temperature sensor 111, an interlayer temperature sensor 112, a module temperature sensor 113, a battery cell voltage detection component 114, and a battery pack pressure monitoring sensor 115. Without being limited thereto, the sensors used may include a single sensor, two sensors, or more than two sensors therein.

The balanced circuit board temperature sensor 111 is configured to collect a balanced circuit board temperature Tb, the interlayer temperature sensor 112 is configured to detect an interlayer space temperature Tg, the module temperature sensor 113 is configured to collect a module temperature Tc, the battery cell voltage detection component 114 is configured to detect a battery cell voltage Vc of a battery module, and the battery pack pressure monitoring sensor 115 is configured to detect an air pressure P. The sampler 12 can receive sensing signals collected by the balanced circuit board temperature sensor 111, the interlayer temperature sensor 112, the module temperature sensor 113, the battery cell voltage detection component 114, and the battery pack pressure monitoring sensor 115 in a sleep mode, and determine whether the collected sensing signals are abnormal. For example, the sampler 12 can compare the collected balanced circuit board temperature Tb, interlayer space temperature Tg, battery module temperature Tc, and battery cell voltage Vc of the battery module with a corresponding balanced circuit board temperature threshold Ttb, interlayer space temperature threshold Ttg, module temperature threshold Ttc, and battery cell voltage Vtc of the battery, respectively, compare the air pressure P of the interlayer space with an air pressure threshold Tp, and compare a change rate ΔP of the air pressure of the interlayer space with a preset air pressure rate threshold. According to comparison results, it is determined whether it is necessary to generate a wake-up identifier to wake up the monitor 13.

The monitor 13 is configured to convert the wake-up identifier into a wake-up signal so that the converted wake-up signal can be recognized by the BMS 14. For example, the wake-up identifier can be converted into an SPI communication protocol-based wake-up signal, or an UART communication protocol-based wake-up signal. The monitor 13 is configured to provide a communication interface for communication with the sampler. When the sampler detects an abnormal signal indicating that the battery may be in the thermal runaway state, the monitor 13 is waked up through the communication interface.

A plurality of samplers may be arranged to monitor the collected sensing signals, and through the daisy-chained circuit structure, by means of the communication interface provided by the monitor 13, the wake-up identifier determined through an abnormal sensing signal may be transmitted to the monitor 13 through a daisy chain. After the wake-up identifier is converted and processed by the monitor 13, the wake-up signal is generated and sent to the BMS 14 so as to wake up the BMS 14 and cause the BMS 14 to enter a continuous working mode.

In the continuous working mode, the BMS 14 may increase a sampling frequency and determines, based on a sampled signal, whether to generate an early-warning signal, thereby reducing the losses according to the early-warning signal. For example, for an early-warning signal of a vehicle battery, based on the early-warning signal, passengers can be notified to leave a vehicle.

Alternatively, the battery pack pressure monitoring sensor 115 may also directly wake up the BMS 14 to enter the continuous working mode when detecting that a battery pack pressure is greater than a preset pressure threshold. In the continuous working mode, the sampling frequency of the battery pack pressure (i.e., intensity of pressure inside the battery pack) is increased.

The battery pack pressure monitoring sensor 115 mentioned above may be configured to monitor the pressure inside the battery module.

The purpose of adding the battery pack pressure monitoring sensor on the basis of Embodiment 1 is that when battery cells are connected in parallel, under thermal runaway conditions, the battery cell voltage of the battery may not change substantially. If high-temperature smoke sprayed by a thermal runaway spray valve does not flow through a thermistor, the detected temperature may not change significantly. Relying on combined detection of the temperature and the battery cell voltage of the battery may result in missed alarm of the thermal runaway state. In order to avoid this defect, air pressure detection is coupled with the detection of the temperature and the battery cell voltage of the battery, so that the BMS can be waked up in time and the probability of missed alarm of thermal runaway early-warning can be reduced.

In a possible implementation, a pressure monitoring sensor may be separately arranged for monitoring and waking up the BMS.

Figure 11:
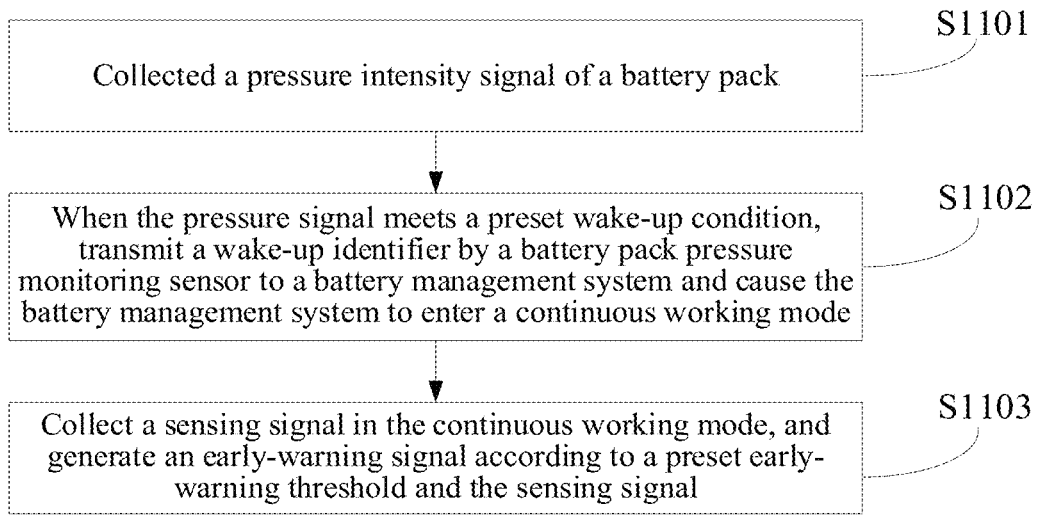
FIG. 11 is a schematic flowchart of implementation of a yet another thermal runaway early-warning method for a battery according to an embodiment of the present application.

FIG. 11 is a schematic flowchart of implementation of a thermal runaway early-warning method for a battery according to an embodiment of the present application. As shown in FIG. 11, the flow includes:

S1101: Collected a pressure intensity signal of a battery pack.

In the embodiment of the present application, a battery pack pressure monitoring sensor is added on the basis of Embodiment 1. The battery pack pressure monitoring sensor may be arranged in the interlayer space. In order to detect changes of an air pressure more effectively and reliably, the battery pack pressure monitoring sensor may be arranged in the interlayer space and close to the explosion-proof valve, so that the changes of the air pressure caused by thermal runaway in the interlayer space can be detected more sensitively.

A sensing signal collected in the embodiment of the present application includes one or more signals such as a balanced circuit board temperature $T_b$, an interlayer space temperature $T_g$, a battery module temperature $T_c$, and an interlayer space air pressure P. The interlayer space temperature includes a temperature collected by the temperature sensor arranged in the interlayer space, or may also include a temperature collected by the temperature sensor arranged on the upper surface of the upper cover of the interlayer space at the bottom.

S1102: When the pressure signal meets a preset wake-up condition, transmit a wake-up identifier by the battery pack pressure monitoring sensor to a BMS and cause the BMS to enter a continuous working mode.

The pressure intensity signal in the battery pack is collected by the battery pack pressure monitoring sensor, and the pressure intensity signal is compared with a corresponding threshold to determine whether the received sensing signal is abnormal. When abnormality occurs, a wake-up signal is sent to an MCU of the BMS.

When the pressure intensity signal is compared with a corresponding threshold, it may include comparing the pressure intensity signal with a preset pressure intensity threshold, or comparing a pressure intensity signal change rate with a predetermined change rate threshold.

S1103: Collect the sensing signal in the continuous working mode, and generate an early-warning signal according to a preset early-warning threshold and the sensing signal.

In the continuous working mode, the BMS collects the sensing signal by increasing the sampling frequency. The collected sensing signal includes but is not limited to one or more of a temperature at the interlayer space, an air pressure at the interlayer space, a change rate of the temperature at the interlayer space, a change rate of the air pressure at the interlayer space, a module temperature, a change rate of the module temperature, a balanced circuit board temperature, and a change rate of the balanced circuit board temperature.

When the collected sensing signal includes the temperature at the interlayer space, the air pressure at the interlayer space, the change rate of the temperature at the interlayer space, the change rate of the air pressure at the interlayer space, the module temperature, the change rate of the module temperature, the balanced circuit board temperature, and the change rate of the balanced circuit board, the collected sensing signal may be compared with a corresponding threshold to determine whether the battery state is abnormal. When two of them are abnormal, the early-warning signal can be generated so that the thermal runaway abnormality of the battery can be promptly addressed. By setting the generation of the early-warning signal when two or more items are abnormal, the accuracy of generating the early-warning signal can be improved and a false alarm rate can be reduced.

It is not limited to generating the early-warning signal when it is determined that two or more of the sensing signals are abnormal, and it can also be set that the early-warning signal is generated when any one of them is abnormal.

It should be understood that the magnitudes of the sequence numbers of the steps mentioned above do not mean the priority of the execution sequence. The execution sequence of the processes should be determined based on functions and internal logics thereof, and should not impose any limitation on the implementation processes of the embodiment of the present application.

Figure 12:
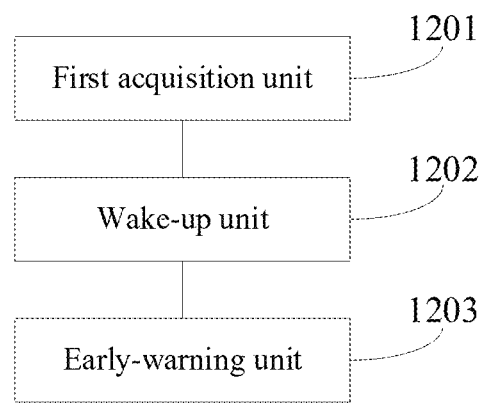
FIG. 12 is a schematic view of a thermal runaway early-warning apparatus for a battery according to an embodiment of the present application.

FIG. 12 is a schematic view of a thermal runaway early-warning apparatus for a battery according to an embodiment of the present application. An interlayer space is arranged at an end of the battery, and the interlayer space is configured to discharge smoke in the event of thermal runaway of a battery cell of the battery. As shown in FIG. 12, the apparatus includes:

a first acquisition unit 1201, configured to acquire a first signal at the interlayer space;

a wake-up unit 1202, configured to wake up a BMS to enter a continuous working mode when the first signal meets a preset wake-up condition; and an early-warning unit 1203, configured to acquire a second smoke signal in the continuous working mode, and generate a thermal runaway early-warning signal when the second smoke signal meets a preset early-warning condition.

The thermal runaway early-warning apparatus for a battery as shown in FIG. 12 corresponds to the thermal runaway early-warning method for a battery in the embodiments mentioned above.

Figure 13:
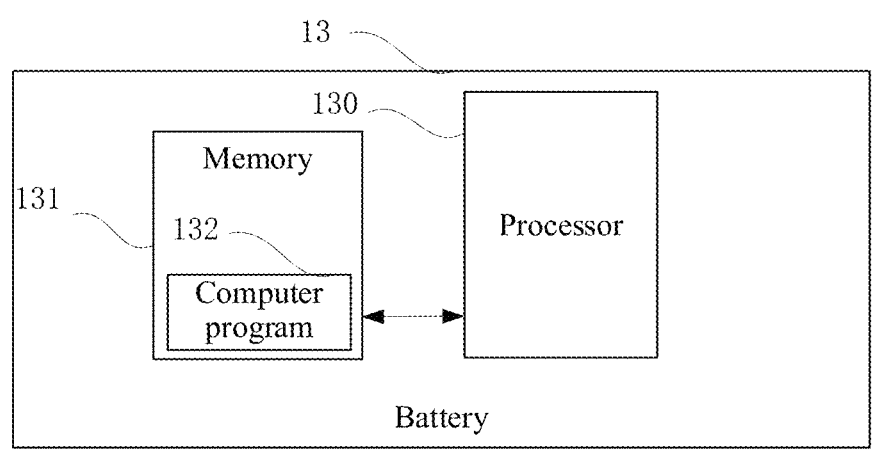
FIG. 13 is a schematic structural view of a battery according to an embodiment of the present application.

FIG. 13 is a schematic view of a battery according to an embodiment of the present application. As shown in FIG. 13, a battery 13 in this embodiment includes: a processor 130, a memory 131, and a computer program 132, such as a battery program, stored in the memory 131 and runnable in the processor 130. When executing the computer program 132, the processor 130 implements steps in the method embodiments mentioned above. Alternatively, when executing the computer program 132, the processor 130 implements the functions of each module/unit in the device embodiment mentioned above.

Exemplarily, the computer program 132 may be divided into one or more modules/units, and the one or more modules/units are stored in the memory 131 and executed by the processor 130 to implement the present application. The one or more modules/units may be a series of computer program instruction segments capable of completing specific functions, and the instruction segments are used to describe the execution process of the computer program 132 in the battery 13.

The battery may include, but is not limited to, the processor 130 and the memory 131. Those skilled in the art may understand that FIG. 13 shows only an example of the battery 13 and does not constitute a limitation on the battery 13. The battery may include more or fewer components than those shown in the figure, or combine certain components, or include different components. For example, the battery may also include an input/output device, a network access device, a bus, and the like.

The processor 130 may be a central processing unit (CPU), another general-purpose processor, a digital signal processor (DSP), an application specific integrated circuit (ASIC), a field-programmable gate array (FPGA) or another programmable logic device, a discrete gate or transistor logic device, a discrete hardware component, or the like. The general-purpose processor may be a microprocessor or the processor may also be any conventional processor.

The memory 131 may be an internal storage unit of the battery 13, such as a hard disk or memory of the battery 13. The memory 131 may also be an external storage device of the battery 13, such as a plug-in hard disk, a smart media card (SMC), a secure digital (SD) card, a flash card, etc., which are equipped on the battery 13. Furthermore, the memory 131 may include both an internal storage unit of the battery 13 and an external storage device. The memory 131 is used to store the computer program and other programs and data required by the battery. The memory 131 may also be used to temporarily store data that has been output or is to be output.

Those skilled in the art may clearly understand that for the purpose of convenient and brief description, division of the functional units and modules mentioned above is taken as an example for illustration. In actual applications, the functions mentioned above can be allocated to different functional units and modules and implemented according to requirements, that is, an internal structure of the apparatus is divided into different functional units or modules to implement all or part of the functions described above. All the functional units and modules in the embodiments may be integrated into one processing unit, or each unit independently exists physically, or two or more units may be integrated into one unit. The integrated units mentioned above may be implemented in a form of hardware or in a form of functional units of software. In addition, the specific names of the functional units and modules are only for the convenience of distinguishing each other and are not used to limit the scope of protection of the present application. The specific working process of the units and modules in the system described above may refer to the corresponding process in the foregoing method embodiments, and description thereof will be omitted herein.

In the embodiments mentioned above, the description of each embodiment has its own emphasis. For parts that are not described in detail in a certain embodiment, reference may be made to the relevant descriptions of other embodiments.

Those of ordinary skill in the art may realize that units and algorithm steps of each example described with reference to the embodiments disclosed herein can be implemented in electronic hardware, or a combination of computer software and electronic hardware. Whether these functions are performed in hardware or software depends on a specific application and a design constraint condition of the technical solution. Those skilled in the art may use different methods to implement the described functions for each particular application, but it should not be considered that the implementation goes beyond the scope of the present application.

In the embodiments provided in the present application, it should be understood that the disclosed device and method may be implemented in other manners. For example, the device embodiments described above are only illustrative. For example, the division of the modules or units is merely a logical function division and may be other division during actual implementation. For example, a plurality of units or components may be combined or integrated into another system, or some features may be ignored or not performed. On the other hand, the shown or discussed mutual coupling or direct coupling or communication connection may be indirect coupling or communication connection through some interfaces, apparatuses, or units, and may be implemented in electrical, mechanical, or other forms.

The units described as separate components may or may not be physically separated, and components displayed as units may or may not be physical units, that is, may be located in one place, or may be distributed to a plurality of network units. Some or all of the units may be selected according to actual needs to achieve the purpose of the solution in this embodiment.

In addition, the functional units in the embodiments of the present application may be integrated into one processing unit, or the units may physically exist separately, or two or more of the units may be integrated into one unit. The integrated unit mentioned above can be implemented in the form of hardware or in the form of a functional unit of software.

When the integrated module/unit is implemented in the form of a functional unit of software and sold or used as an independent product, the integrated module/unit may be stored in a computer-readable storage medium. Based on such understanding, to implement all or part of the processes in the embodiment methods mentioned above, the present application may also instruct relevant hardware through a computer program. The computer program may be stored in a computer-readable storage medium, and the computer program may implement the steps of the method embodiments mentioned above when executed by a processor. The computer program includes computer program codes, which may be in a source code form, in an object code form, an executable file or in some intermediate forms. The computer-readable medium may include: any entity or device capable of carrying the computer program code, a recording medium, a USB flash disk, a mobile hard disk, a magnetic disk, an optical disk, a computer memory, a read-only memory (ROM), a random access memory (RAM), an electric carrier signal, a telecommunication signal, a software distribution medium, etc. It should be noted that the content contained in the computer-readable medium can be appropriately increased or decreased according to the requirements of legislation and patent practices in the jurisdiction. For example, in some jurisdictions, according to legislation and patent practices, the computer-readable medium does not include an electric carrier signal or a telecommunication signal.

The embodiments described above are merely used for describing the technical solutions of the present application, instead of limiting the present application; although the present application is described in detail with reference to the foregoing embodiments, those of ordinary skill in the art should understand that: they can still make modifications on the technical solutions described in the foregoing embodiments, or perform equivalent replacements on a part of technical features thereof; and these modifications or replacements are not intended to make the essences of the corresponding technical solutions depart from the spirit and scope of the technical solutions of the embodiments of the present application, but should all be encompassed within the scope of protection of the present application.

What is claimed is:

1. A thermal runaway early-warning method for a battery, wherein the battery is provided with an accommodating space, the accommodating space is configured to discharge smoke in the event of thermal runaway of a battery cell of the battery, and the method comprises:
    acquiring a detection signal at a detection position comprising the accommodating space; and
generating a thermal runaway early-warning signal according to the detection signal;
wherein:
    the detection signal comprises a first signal and a second signal; and
    the acquiring a detection signal at a detection position comprising the accommodating space comprises: acquiring the first signal at the detection position comprising the accommodating space; and when the first signal meets a preset wake-up condition, waking up a battery management system, and acquiring the second signal by the battery management system; wherein a sampling frequency of the second signal is greater than a sampling frequency of the first signal.

2. The method according to claim 1, wherein the accommodating space comprises one or more of an interlayer space of the battery and an internal space of a hollow beam structure of the battery.

3. The method according to claim 2, wherein when the accommodating space comprises the interlayer space of the battery, the detection position comprises any position in the interlayer space and/or a surface of an inner layer of the interlayer space.

4. The method according to claim 1, wherein the first signal comprises one or more of a temperature signal and an air pressure signal of which the detection position is located at the accommodating space.

5. The method according to claim 1, wherein the first signal further comprises one or more of a battery voltage, a balanced circuit board temperature of the battery, and a battery cell temperature of the battery.

6. The method according to claim 1, wherein the second signal comprises two or more of a temperature signal at the accommodating space, an air pressure signal at the accommodating space, a temperature change rate at the accommodating space, an air pressure change rate at the accommodating space, a battery cell voltage of the battery, a battery cell temperature of the battery, a temperature change rate of the battery cell of the battery, a balanced circuit board temperature of the battery, and a temperature change rate of the balanced circuit board of the battery.

7. The method according to claim 6, wherein the generating a thermal runaway early-warning signal according to the detection signal comprises:
    when two or more signals in the second signal meet a preset early-warning requirement, generating the thermal runaway early-warning signal.

8. The method according to claim 1, wherein the acquiring a detection signal at a detection position comprising the accommodating space comprises:
    monitoring the first signal through a monitor with a host wake-up function; and
    when the first signal meets the preset wake-up condition, waking up the battery management system through the monitor to enter a normal working mode from a sleep mode, and acquiring the second signal by the battery management system in the normal working mode.

9. The method according to claim 1, wherein the acquiring a detection signal at a detection position comprising the accommodating space comprises:
    sampling the first signal in a low-power consumption mode through a sampling controller; and
    when the first signal meets the preset wake-up condition, waking up the battery management system through the sampling controller to enter a normal working mode, switching the sampling controller from the low-power consumption mode to a normal working mode, and controlling the sampling controller by the battery management system to acquire the second signal in the normal working mode.

10. The method according to claim 1, wherein the acquiring a detection signal at a detection position comprising the accommodating space comprises:
    comparing the first signal with a preset threshold signal; and
    when the comparison result meets the preset wake-up condition, triggering the battery management system to enter a normal working mode from a sleep mode, and controlling a sampler by the battery management system to acquire the second signal in the normal working mode.

11. The method according to claim 1, wherein when battery cells of the battery are connected in parallel, the first signal comprises an air pressure signal and/or a temperature signal, and a collection position of the air pressure signal and/the temperature signal comprises the accommodating space.

12. A thermal runaway early-warning apparatus for a battery, wherein the battery is provided with an accommodating space, the accommodating space is configured to discharge smoke in the event of thermal runaway of a battery cell of the battery, and the method comprises:
 a detection signal acquiring unit, configured to acquire a detection signal at a detection position comprising the accommodating space; and
 an early-warning unit, configured to generate a thermal runaway early-warning signal according to the detection signal wherein the detection signal acquiring unit is provided for acquire a first signal and a second signal;
 the detection signal acquiring unit being configured to acquire a detection signal at a detection position comprising the accommodating space comprises:
 the detection signal acquiring unit being configured to acquire the first signal at the detection position comprising the accommodating space; and when the first signal meets a preset wake-up condition, the detection signal acquiring unit being configured to wake up a battery management system, and acquire the second signal by the battery management system; wherein a sampling frequency of the second signal is greater than a sampling frequency of the first signal.

13. A battery, comprising: a memory, a processor, and a computer program stored in the memory and runnable in the processor, wherein when executing the computer program, the processor implements steps of the method according to claim 1.

14. A non-transitory computer-readable storage medium, the computer-readable storage medium storing a computer program, wherein when executed by a processor, the computer program implements steps of the method according to claim 1.

* * * * *